United States Patent
Sitsky et al.

(10) Patent No.: US 9,785,700 B2
(45) Date of Patent: *Oct. 10, 2017

(54) SYSTEMS AND METHODS FOR LOAD-BALANCING BY SECONDARY PROCESSORS IN PARALLELIZED INDEXING

(71) Applicant: Nuix Pty Ltd, Sydney (AU)

(72) Inventors: David Sitsky, Garran (AU); Eddie Sheehy, Willoughby (AU)

(73) Assignee: Nuix Pty Ltd, Sydney (AU)

( * ) Notice: Subject to any disclaimer, the term of this patent is extended or adjusted under 35 U.S.C. 154(b) by 91 days.

This patent is subject to a terminal disclaimer.

(21) Appl. No.: 13/961,030

(22) Filed: Aug. 7, 2013

(65) Prior Publication Data
US 2013/0325873 A1 Dec. 5, 2013

Related U.S. Application Data

(63) Continuation-in-part of application No. 13/705,522, filed on Dec. 5, 2012, now Pat. No. 9,665,573, which
(Continued)

(51) Int. Cl.
| | | |
|---|---|---|
| G06F 13/00 | (2006.01) | |
| G06F 17/30 | (2006.01) | |
| G06F 9/50 | (2006.01) | |

(52) U.S. Cl.
CPC ........ *G06F 17/30619* (2013.01); *G06F 9/505* (2013.01); *G06F 17/30613* (2013.01); *G06F 2209/5017* (2013.01)

(58) Field of Classification Search
USPC .......... 707/741; 718/100, 105–106; 709/201, 709/202, 208, 226
See application file for complete search history.

(56) References Cited

U.S. PATENT DOCUMENTS

| | | | |
|---|---|---|---|
| 5,230,047 A | 7/1993 | Frey, Jr. et al. | |
| 5,590,284 A | 12/1996 | Crosetto | |

(Continued)

FOREIGN PATENT DOCUMENTS

| | | | |
|---|---|---|---|
| KR | 20030013619 A | 2/2003 | |
| KR | 20050057834 A | 6/2005 | |

(Continued)

OTHER PUBLICATIONS

International Search Report and Written Opinion mailed Sep. 29, 2009, for International application No. PCT/US2009/033759 with interntional filing date Feb. 11, 2009 (8 pages).

*Primary Examiner* — Hung T Vy
(74) *Attorney, Agent, or Firm* — Brown Rubnick LLP; Mark S. Leonardo

(57) ABSTRACT

The invention relates to electronic indexing, and more particularly, to the parallelization of indexing. Systems and methods of the invention index data archives by breaking a job into work items and sending the work items to multiple processors that can each determine whether to index data associated with the work item or to create a new work item and have a different processor index the data. This gives the system an internal load-balancing that results in indexing jobs during which no processor stands idle while another processor indexes data of unexpected complexity.

17 Claims, 3 Drawing Sheets

Related U.S. Application Data is a continuation of application No. 12/866,950, filed as application No. PCT/US2009/033759 on Feb. 11, 2009, now Pat. No. 8,359,365.

(60) Provisional application No. 61/027,603, filed on Feb. 11, 2008, provisional application No. 61/027,600, filed on Feb. 11, 2008.

(56) References Cited

U.S. PATENT DOCUMENTS

| | | | |
|---|---|---|---|
| 5,838,913 A | | 11/1998 | Lysejko et al. |
| 5,963,944 A | | 10/1999 | Adams |
| 5,987,468 A | * | 11/1999 | Singh ............... G06F 17/30327 |
| 6,219,833 B1 | * | 4/2001 | Solomon et al. ............ 717/149 |
| 6,651,065 B2 | | 11/2003 | Brown et al. |
| 6,993,763 B2 | | 1/2006 | Hayes, Jr. |
| 7,162,620 B2 | | 1/2007 | Magoshi |
| 7,263,536 B1 | | 8/2007 | Pederson |
| 7,523,130 B1 | | 4/2009 | Meadway et al. |
| 7,669,036 B2 | * | 2/2010 | Brown et al. .................. 712/30 |
| 7,672,790 B2 | | 3/2010 | McGraw et al. |
| 7,730,113 B1 | | 6/2010 | Payette et al. |
| 7,743,189 B2 | | 6/2010 | Brown et al. |
| 7,751,805 B2 | | 7/2010 | Neven et al. |
| 8,239,938 B2 | | 8/2012 | Simeral et al. |
| 8,359,365 B2 | | 1/2013 | Sitsky et al. |
| 8,370,845 B1 | | 2/2013 | Le Grand |
| 8,396,838 B2 | | 3/2013 | Brockway et al. |
| 8,407,190 B2 | | 3/2013 | Prahlad et al. |
| 8,429,147 B1 | | 4/2013 | Dutton et al. |
| 8,429,165 B1 | | 4/2013 | Jung et al. |
| 8,491,384 B2 | | 7/2013 | Tran et al. |
| 8,499,025 B2 | | 7/2013 | Howard |
| 8,510,237 B2 | | 8/2013 | Cascaval et al. |
| 8,510,492 B2 | | 8/2013 | Martchovsky |
| 8,516,174 B2 | | 8/2013 | Goerlich et al. |
| 8,527,972 B2 | | 9/2013 | Shimura |
| 8,531,942 B2 | | 9/2013 | Buttner et al. |
| 8,533,717 B2 | | 9/2013 | Kilian et al. |
| 8,555,265 B2 | | 10/2013 | Chambers et al. |
| 8,819,694 B2 | | 8/2014 | Corona |
| 2002/0009079 A1 | * | 1/2002 | Jungck ............... H04L 29/12066 370/389 |
| 2002/0029207 A1 | * | 3/2002 | Bakalash ........... G06F 17/30457 |
| 2003/0101099 A1 | | 5/2003 | Sheltz et al. |
| 2003/0167295 A1 | | 9/2003 | Choo |
| 2003/0182355 A1 | | 9/2003 | Edahiro et al. |
| 2003/0226108 A1 | | 12/2003 | Oezgen |
| 2004/0003039 A1 | | 1/2004 | Humphrey et al. |
| 2004/0015978 A1 | * | 1/2004 | Orii ..................... G06F 11/3447 718/105 |
| 2004/0111552 A1 | | 6/2004 | Arimilli et al. |
| 2007/0073894 A1 | * | 3/2007 | Erickson et al. ............. 709/230 |
| 2008/0030764 A1 | * | 2/2008 | Zhu et al. ..................... 358/1.15 |
| 2008/0059452 A1 | | 3/2008 | Frank |
| 2008/0080718 A1 | | 4/2008 | Meijer et al. |
| 2008/0082490 A1 | | 4/2008 | MacLaurin et al. |
| 2008/0104609 A1 | * | 5/2008 | D'Amora ............... G06N 3/006 718/106 |
| 2008/0143707 A1 | | 6/2008 | Mitchell |
| 2010/0162261 A1 | * | 6/2010 | Shashidhara ......... G06F 9/5088 718/105 |
| 2011/0047551 A1 | | 2/2011 | Sitsky et al. |
| 2011/0274329 A1 | | 11/2011 | Mathew et al. |
| 2012/0233130 A1 | | 9/2012 | Vedachalam et al. |
| 2012/0265762 A1 | | 10/2012 | Wade et al. |
| 2012/0296891 A1 | | 11/2012 | Rangan |
| 2013/0021238 A1 | | 1/2013 | Laufgraben |
| 2013/0024424 A1 | | 1/2013 | Prahlad et al. |
| 2013/0028106 A1 | | 1/2013 | Frost |
| 2013/0060933 A1 | | 3/2013 | Tung et al. |
| 2013/0114107 A1 | | 5/2013 | Park |
| 2013/0127851 A1 | | 5/2013 | Richards, Jr. |
| 2013/0132468 A1 | | 5/2013 | Azeez et al. |
| 2013/0173499 A1 | | 7/2013 | Cannon |
| 2013/0205018 A1 | | 8/2013 | Rahman et al. |
| 2013/0212090 A1 | | 8/2013 | Sperling et al. |
| 2013/0231912 A1 | | 9/2013 | Ye et al. |
| 2013/0237200 A1 | | 9/2013 | Nystrom et al. |
| 2013/0238572 A1 | | 9/2013 | Prahlad et al. |
| 2013/0325873 A1 | | 12/2013 | Sitsky et al. |

FOREIGN PATENT DOCUMENTS

| | | |
|---|---|---|
| WO | 03079206 A1 | 9/2003 |
| WO | 2009/102765 A2 | 8/2009 |

* cited by examiner

SYSTEMS AND METHODS FOR LOAD-BALANCING BY SECONDARY PROCESSORS IN PARALLELIZED INDEXING

CROSS-REFERENCE TO RELATED APPLICATION

This patent application is a continuation-in-part of U.S. patent application Ser. No. 13/705,522, filed Dec. 5, 2012, which application is a continuation of U.S. patent application Ser. No. 12/866,950, filed on Nov. 5, 2010, which application is a National Stage Entry of PCT/US09/33759 with an International Filing Date of Feb. 11, 2009, which application claims priority to both U.S. Provisional Patent Application Ser. No. 61/027,600, filed Feb. 11, 2008, and U.S. Provisional Patent Application Ser. No. 61/027,603, filed Feb. 11, 2008, the contents of each of which are incorporated by reference.

FIELD OF THE INVENTION

The present disclosure generally relates to the field of electronic document indexing, and more particularly, to the parallelization of document indexing in the area of electronic discovery.

BACKGROUND

Businesses accumulate and archive millions of electronic items. Countless emails are sent and received daily. Workers routinely generate new documents. Paper documents are scanned for digital storage. Many pictures and flat files are converted into digital text by optical character recognition. All this activity produces electronic data that is highly unstructured. A directory may contain millions of office documents. An exchange database file may contain millions of email messages, some which contain attachments like zip files or office documents. A zip file can contain office documents, an email message can contain attachments, an Outlook PST file can contain email which itself might contain a PST file.

Some businesses attempt to store all of this in a storage system or archive. Unfortunately, archiving systems introduce added levels of complexity. For example, some archiving systems break up stored electronic items into components and store those components in separate databases, files or disks. For example, an email archive may store body text, headers, and attachments separately. Such a storage structure hides the size and extent of electronic items that would satisfy any certain search criteria until the archive is properly indexed.

Some systems for indexing archives use multiple processors. For example, U.S. Pub. 2008/0030764 to Zhu describes a system in which a primary processor divides a job into work items for secondary processors. Unfortunately, since the internal structure of the archive is not known a priori, any given work item may turn out to be trivially small or unmanageably large. As a result, an entire system can stand idle for days while waiting for a single processor to slog through one email box.

SUMMARY

The invention provides systems and methods for indexing data archives or storage systems by breaking the task up into work items and sending the work items to multiple processors, optionally using multiple virtual machines, that can each determine whether to index data associated with the work item, to create a new work item and have a different processor index the data, or a combination thereof. Since the secondary processors can each determine whether to process data or to pass it to a processor with more available capacity, the system performs an internal load-balancing that results in indexing jobs during which no processor stands idle while another processor indexes data of unexpected complexity. This internal load-balancing is well-suited to archives or storage systems in which electronic items are separated into components that are stored separately, that are associated with unpredictable embedded data, or both. For example, in a storage system such as an archive, a storage area network (SAN), or an enterprise-wide compliance storage system archive, electronic items may be emails, files, disk images, database, other material, or a combination thereof, any of which may be broken up across multiple storage destinations. Individually-stored components may have embedded data objects with more examples of the same electronic items (e.g., a PST may have an emails on it, an email could have a PSTs attached to it, etc.). As each of the multiple processors works on a work item, it may discover embedded data of any complexity and create new work items or even whole new jobs as needed. Because the most complex embedded data structures get allocated the most processing power, stores of electronic items can be quickly reconstituted or indexed.

In particular, the load-balancing secondary processors solve the problem whereby electronic items that are broken up and archived as separate components give no a priori clue as to how to allocate processors for indexing. Each secondary processor can re-allocate processing power as it discovers data. Thus, using a plurality of load-balancing processors of the invention to index electronic items such as emails that have been broken up and archived as components results in an indexing system that can index an enterprise-scale archive or SAN at a speed not previously known or expected. Actionable intelligence is provided from very large unstructured archives rapidly, with initial results becoming available within moments of beginning a job.

Systems and methods of the invention can be used to analyze any form of storage or combination of forms including archives, storage devices, whole storage systems, network storage solutions, and combinations thereof. A storage system can include multiple terabytes (e.g., 100 TB, 400 TB, 1 petabyte (PB), etc.) and can be implemented as a SAN or other storage architecture such as, for example, a clustered or parallel storage technology or a cloud storage system. A storage system such as a SAN may include archives, file shares, Document Management Systems, databases, other structures or devices, or a combination thereof. One or more of these sub-components may in-turn contain cascading series of embedded folders, files, documents, other data structures, or combinations thereof. Systems and methods of the invention use parallel processing to index the entire content of such a storage system.

Systems and methods of the invention are operable for (i) the indexing of archives in which electronic items are separated into components that are stored separately, that are associated with unpredictable embedded data, or both; and (ii) the indexing of storage systems where data is contained within multiple simple and complex containers, each potentially having electronic items separated into components and stored separately or where related documents and items can be stored in separate containers and where searching holistically over all containers and items via an index provides better search and insight. In some embodiments, an index is provided in a form of multiple indexes, each of the same structure as each other. An index thus may be a multi-component structure comprising a plurality of different, standalone indices that are provided and queried (e.g., by software in the indexing system). A query, such as a single logical data query, can retrieve data from across the plurality of linked but standalone indices in a single operation. In this way, the plurality of indices may all be combined logically to be queried to come up with an answer. Thus, systems and methods of the invention are operable to search over multiple unstructured containers, fileshares, etc., together in a storage system with same functionality from the point of view of a user as searching over the content in an archive.

In certain aspects, the invention provides a computer indexing system for indexing an electronic storage system. The indexing system preferably includes a primary processor coupled to a memory and a plurality of secondary processors. The indexing system may operate via one or a plurality of virtual machines and the processing capabilities provided by each virtual machine. Processors may be allocated to virtual machines by a control system such as a hypervisor module. The indexing system is operable to scan a storage system comprising an electronic item stored as a plurality of components and create a work item for each component. Each secondary processor is operable to receive a first work item for a first component, determine characteristics of embedded data within the first component, and use the determined characteristics to further determine whether to index the first component or to create a new work item comprising the first component and send the new work item to a different secondary processor. The primary processor aggregates results generated by the plurality of secondary processors indexing the plurality of components and produces an aggregate comprising an index for the electronic item.

The storage system to be indexed may include one or more of an archive, a SAN, a document management system, a single computer or isolated hard disk, a cloud storage site, a virtual directory, or a combination thereof. In some embodiments, the storage system comprises an email archive and the electronic item is an email message. The storage system may include a database in which an entry within the database corresponds to the email message and specifies the location of the plurality of components. The email may be stored as components such as recipients, metadata, body text, attachments, or system index and the component, as stored within the database may have, as embedded data, an item that was attached to the email (e.g., a zip file that includes a word-processing document, which has an inserted picture). A secondary processor can determine a characteristic of the embedded data (e.g., the presence of a file inserted into a word document that is located within a zip file) to determine whether to index that embedded data or create a new work item. The primary processor can be a unique processor (e.g., performing primarily a coordinating and aggregating function), or all of the processors can be substantially the same (e.g., "primary processor" could just indicate the first considered, or an arbitrary one of the secondary processors).

In some embodiments, systems and methods of the invention can be set to operate at one of multiple different levels. A level may refer to an amount of time, complexity, thoroughness, or data level of a job and may particularly be defined to relate to levels of embedding, selection of certain contents or metadata, or a combination thereof. For example, the invention may employ a multiple definition of index. To illustrate, a lite index could refer to results of an indexing job performed down to the metadata level of all the documents and attachments, optionally including an MD5 fingerprint whereas a full text index relates to indexing metadata and all the text of all the documents held across an entire storage system (e.g., within all the archives, file shares, DMSs etc. in a SAN). In certain embodiments, systems and methods of the invention are implemented to provide "living indexes" and it may be preferable for a living index to be at the defined lite level. A living, lite index may refer to the output of a system and method of continuously indexing across a storage system, preferably performing the indexing down to the level of metadata of documents, files, objects, or attachments.

Aspects of the invention further provide methods for indexing an electronic storage system such as an archive, a SAN, or other storage technologies using a computer indexing system that includes a primary processor coupled to a memory and one or more secondary processors. Methods include using the indexing system to scan a storage system comprising an electronic item stored as a plurality of components and create a work item for each component. Each of the one or more secondary processors is used to receive a first work item for a first component, determine characteristics of embedded data within the first component, and use the determined characteristics to further determine whether to index the first component or to create a new work item comprising the first component and send the new work item to a different secondary processor. The primary processor can be used to aggregate results generated by the one or more secondary processors indexing the plurality of components and to produce an aggregate comprising an index for the electronic item. In some embodiments, methods of the invention are used to index an email archive in which electronic items can be email messages. Methods include indexing a database in which an entry within the database corresponds to the email message and specifies the location of the plurality of components. A secondary processor can be used to determine a characteristic of the embedded data (e.g., the presence of a file inserted into a word document that is located within a zip file) to determine whether to index that embedded data or create a new work item.

In related aspects, the invention provides an electronic information indexing system that includes a primary processor operably coupled to a tangible memory, a first secondary processor, and a second secondary processor. The primary processor is operable to create a work item that specifies a database entry in a storage system and send the work item to the first secondary processor, The database entry may identify locations of components of an electronic item within the storage system. The first secondary processor may be operable to determine characteristics of embedded data within the components, classify the components based on the determined characteristics, index a first component based on a first classification, create a new work item comprising a second component of the electronic item based on a second classification, and send the new work item to the second secondary processor. The second secondary processor may be operable to index the second component. In some embodiments, the electronic item is an archived email message. There may be a primary processor that is operable to aggregate results from the indexing of the first component and the indexing of the second component to provide an index for the email message. In certain embodiments, the database entry identifies locations of five components of the archived email message. For example, the first component comprises text from an email body; the second component comprises an attachment; a third component comprises meta-data; a fourth component comprises a recipient email address; and a fifth component comprises an index or database showing where the components can be found and how many there are. Preferably, the primary processor is further operable to create a plurality of work items wherein each of the plurality of work items specifies data within the archive system to be processed and the first secondary processor and second secondary processor are each operable to classify any work items and create new work items. Further, the first secondary processor may be further operable to determine the characteristics of embedded data within the components of the electronic item, even when the electronic item is behind a firewall of the archive system.

Aspects of the invention provide an electronic item indexing system that includes a primary processor operably coupled to a tangible memory, a first secondary processor, and a second secondary processor. The primary processor is operable to scan a storage system comprising a database entry for an electronic item, create a work item indicating the database entry, and send the work item to the first secondary processor. The first secondary processor is operable to read the database entry, identify a location of a first component of the electronic item, identify a location of a second component of the electronic item, determine that the first component should be processed by the second secondary processor, create a new work item comprising the first component, send the new work item to a second secondary processor, and index the second component to produce a second result. Additionally, the second secondary processor is operable to index the first component to produce a first result. Preferably, the server system is operable to aggregate the first result and the second result and provide an index of the electronic item.

According to an aspect of the present disclosure, a data processing system for parallelizing document indexing is presented. The data processing system is comprised of a primary processor, at least one secondary processor, and a messaging module. The primary processer receives a list of data, which may include embedded data therein, and creates a work item based upon the list of data. The at least one secondary processor processes the work items as provided by the primary processor. The at least one secondary processor further includes a data processor to determine a characteristic of the embedded data and process the embedded data based upon the characteristic. The messaging module of the data processing system exchanges at least one status message between the primary processor and the at least one secondary processor.

According to another aspect of the present disclosure, a method for parallelizing document indexing in a data processing system is presented. The method includes the steps of receiving a list of data having embedded data associated therewith, creating a work item based upon the list of data, exchanging at least one status message, processing the work item, determining a characteristic of the embedded data, and processing the embedded data based upon the characteristic. A work item includes the physical location of the data stored in a data storage medium, at least one data identifier to distinguish the location of the embedded data, and an identifier associated with the data. The at least one status message includes any one or more of the following: a processed work item, a processed work item related to the embedded data, a result of the processed work items, a request for the work item, the creation of a new work item, a request to process the new work item, and a notification relating to the completion of processed work items.

DETAILED DESCRIPTION

Figure 1:
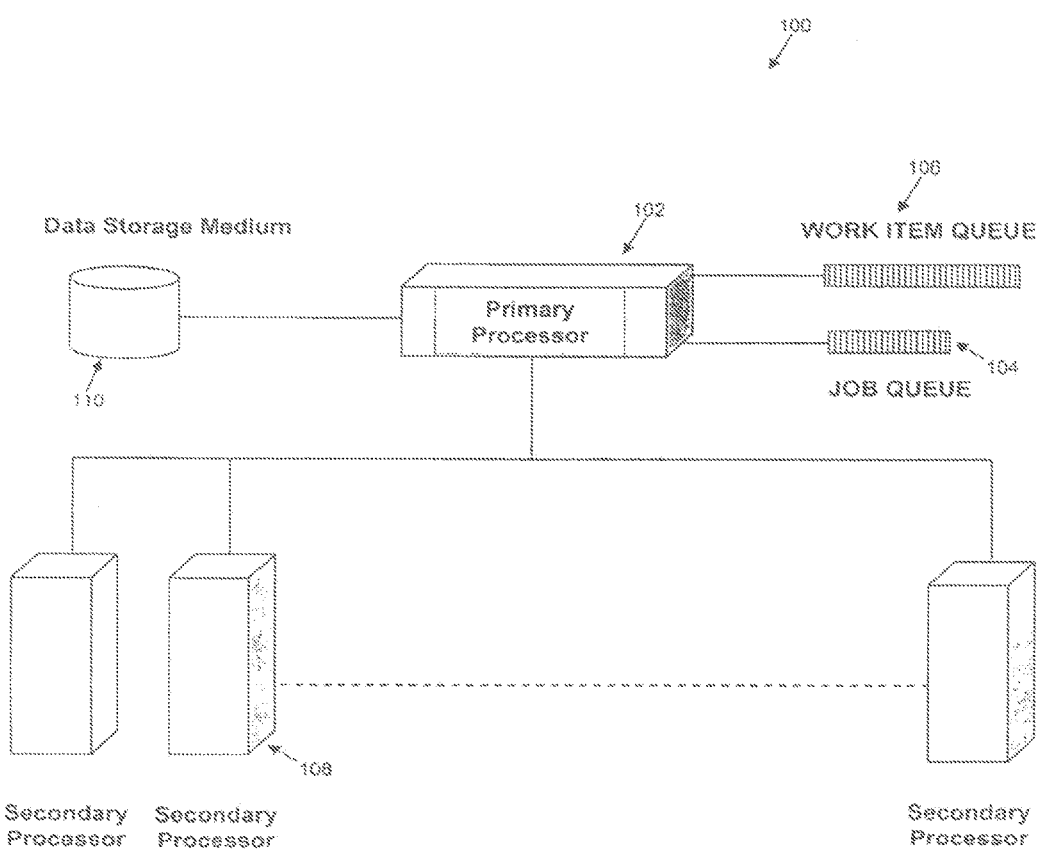
FIG. 1 is a diagram of a data processing system.

The present disclosure generally relates to the field of electronic document indexing, and more particularly, to the parallelization of indexing of storage systems such as an archive, an enterprise storage system, a document management system, a storage device, or other technologies individually or in combination.

In the discussion that follows, the term "processor" shall refer to any computer with at least one processing means. Examples of a processor may include, but are not limited to, single or multiple computers having multi-core processing means (e.g., the processor sold under the trademark CORE i5 or the 3.7 GHz processor sold under the trademark XEON E3-1290V2, both by Intel (Santa Clara, Calif.)). Processor may be taken to refer to the allocation of processing power to a virtual machine as performed by a controlling architecture such as a hypervisor (e.g., the product sold under the trademark HYPER-V by Microsoft, Inc. (Redmond, Wash.). The term "data" shall refer to any collection of numbers, characters, images, instructions, or other forms of information in an electronic format. Examples of data may include, but are not limited to, an exchangeable database file, a disk image file, electronic documents, electronic mail messages, PST files, an electronic document embedded within another file, and a directory containing millions of office documents.

Systems are operable to process data from a single file (i.e. a word doc or email) or to re-assemble data from multiple files to form a copy of the original single data item. This is useful when the storage/imaging systems stores different parts of a file in different places (which sometimes happens). Some examples:

Disk images—items are often segmented/spread across multiple disk blocks.
EDB/STM files—often the email's data record refers to ("points to") an associated record, e.g., RFC822 text in an STM ("stream") file (i.e. needing to merge two or more data files to create a copy of the original).

Additionally, systems and methods of the invention are provided for complex processing. For example, some structures such as Symantec Vault/EMC email Extender (i.e. big archives) involve databases such as Microsoft SQL Server which point to the location of components of the data. System and methods of the invention can read the database records to discern the locations of those components, find the components, and re-assemble the data streams into the original items (e.g., making a new copy or new index of an archived email). An extension of this problem comes up when an archive (e.g., Symantec's Vault) uses single instance imaging (i.e. where just one copy of an email or attachment is kept rather than many for storage optimization). The database keeps track of where the original attachment, email body, other component(s), or a combination thereof is located, and systems and methods of the invention—by including the database in the indexing process—re-assembles the data appropriately by inspecting the item's record(s) in the database. Thus, systems and methods of the invention are operable to contact a database within an archive system, wherein the database indicates locations of components of archived items. Moreover, systems and methods of the invention are operable to assemble or index those items even where data is stored via single instance imaging.

In certain embodiments, the invention provides systems and methods for indexing only recently-changed content of a storage system. This may be referred to as, "scanning for new child items within an already indexed dataset and indexing the new items only." This allows systems and methods of the invention to access a dataset (e.g., reload a complex archive such as a mail server or compliance storage system including, for example, an updated .NSF/.EDB file), find new child items, and load the new child items into the right place in an existing "data tree" in the existing case. All existing items, GUIDs (internal identifiers), and annotations are preserved. When a specific item of data is loaded, systems specify exactly which part of the data tree it should occupy. This means that new child-items can be found, indexed, and slotted into the appropriate (i.e. correct spot) in the index—keeping everything else in place.

In some embodiments, systems and methods of the invention perform a preliminary scan over a large data set that is less exhaustive than a full indexing job, and allows a user to select a subset of the overall data archive based on the results of the preliminary scan. The system can then exhaustively index the subset selected by the user. This can be described as doing a "quick metadata scan" over a large data set quickly, allowing an investigator to narrow down the items of interest, and reloading the items of interest with "richer" process settings without moving those items of interest (i.e. leaving them in place) for a deeper investigation. Prior art systems copied the items of interest or removed them from the archive being indexed. In contrast, systems and methods of the invention do the enriched, exhaustive search in place. This allows indexing to proceed more rapidly and less obtrusively, as target data does not need to be pulled out of the business enterprise's existing data systems.

In certain embodiments, systems and methods of the invention operate at one of multiple different levels. A level may refer to complexity or data level of a job and may particularly relate to levels of embedding, selection of certain contents or metadata, or a combination thereof. For example, multiple definitions of an index may be used and a computer indexing system can be set to operate to produce the index of a selected definition. To illustrate, a lite index could refer to results of an indexing job performed down to the metadata level of all the documents and attachments including an MD5 fingerprint whereas a full text index relates to indexing metadata and all the text of all the documents held across an entire storage system (e.g., within all the archives, file shares, DMSs etc. in a SAN).

In certain embodiments, systems and methods of the invention are implemented to provide living indexes that include data being continuously refreshed or updated by an indexing system of the invention. In a preferred embodiment, a living index is provided at a lite level. A living, lite index may refer to the output of a system and method of continuously indexing across a storage system, preferably performing the indexing down to the level of metadata of documents, files, objects, or attachments.

In general, systems and methods of the invention provide a data indexing system and method to thoroughly index vast quantities of unstructured data in place and within a reasonable time. The invention includes the insight that data repositories hold massive volumes of unstructured "dark data" in a variety of formats and storage systems. As a rough approximation for a general description, levels of complexity in data storage could be described, from simplest to more complex, as: (i) text or html; (ii) document; (iii) containers; (iv) complex containers; (v) massive, complex containers; and (vi) compliance storage systems. Text and HTML can include, for example, log files, web pages, or social networking posts such as posts on the web site Twitter.

Documents may contain text or HTML, metadata, formatting and embedded content. The common formats include word processing documents, spreadsheets, and presentations.

Containers can be structures of varying complexity designed to embed large numbers of items, with accompanying metadata. Existing indexing engines don't often extract content embedded within these files or don't deal well with the complexities of the formats. Examples of containers include folders, compressed (e.g., zip, tar) files, disk images, and single-user email databases such as PST, OST, NSF and mbox files.

Complex containers, which may be, for example, multiple-user email databases, contain even deeper levels of embedding and more complex metadata. They can reach many terabytes in size and contain millions of embedded items. Examples of complex containers include databases from the mail server sold under the trademark EXCHANGE by Microsoft Corporation (Redmond, Wash.), the business application platform sold under the trademark LOTUS DOMINO by IBM Corporation (Armonk, N.Y.), and the software platform sold under the trademark GROUPWISE by Novell, Inc. (Provo, Utah), as well as large file systems that contain embedded containers and other complex containers.

Massive, complex containers include enterprise-scale systems that wrap proprietary containers around each file or email message they store. These systems are so complex they require database lookups to locate text, metadata and attachments, which are typically stored separately. While they provide native searching capabilities, these are almost never designed with the needs of electronic discovery, investigation or information governance in mind. Examples of massive, complex containers include email archives, content management systems, or items from content management platforms such as the platform sold under the trademark SHAREPOINT by Microsoft Corporation (Redmond, Wash.).

Compliance storage systems can include, for example, "write once, read many" (WORM) storage repositories that obfuscate content by adding additional layers of proprietary wrappers around the data stored in them. Many organizations that face retention regulations have invested in compliance storage systems to ensure data, once stored, cannot be tampered with. Generally, since data stored in these systems cannot be deleted, organizations looking to remove redundant, outdated or trivial data must instead identify the valuable data and migrate it to a new platform. Examples of compliance storage systems include the content-addressable storage (CAS) platform sold under the trademark CENTERA by EMC Corporation (Hopkinton, Mass.) or the non-erasable compliance storage software sold under the trademark SNAPLOCK COMPLIANCE by NetApp (Sunnyvale, Calif.).

In some embodiments, a storage system is a SAN, i.e., a dedicated network that provides access to consolidated, block level data storage. SANs are primarily used to make storage devices, such as disk arrays, tape libraries, and optical jukeboxes, accessible to servers so that the devices appear like locally attached devices to the operating system.

A SAN may have its own network of storage devices that are generally not accessible through the local area network by other devices.

A data storage system indexed by the invention can include components for network attached storage (NAS). A NAS uses file-based protocols such as NFS or SMB/CIFS and preferably the storage is remote. In a NAS, computers request a portion of an abstract file rather than a disk block.

In general, more complex storage systems store larger volumes of data but lack the capability to search, index, access, or manage it. In particular, complex storage systems do not cooperate well with existing external indexing applications.

Systems and methods of the invention are operable to provide various service methodologies including, for example, deleting data that has no business value; identifying and preventing potential privacy breaches; locating and automatically classifying company records in the wild; intelligently migrating important data to lower-cost or more flexible repositories (e.g., cloud storage); or proactively mining data for valuable information. Any indexing operation can be accompanied by copy, show, delete, delete "all but", or similar operations for results that match search one or more search criterion. Search criteria can include testing for certain values in metadata (e.g., created or modified on, before, after, or within a certain date or date range; created or modified by a certain user, having certain read, write, execute permissions; containing certain content types such as picture files or videos; etc.). Additionally, matching criteria for electronic items being indexed can be specified through the use of regular expressions, which can be applied to document contents, embedded data, or a combination thereof. For example, all electronic items accessed by user John Smith that contain a character string matching /(Sls)ell [0-9]{0-4} shares.* ([A-Z]{2-3})/ can be operated on (e.g., copied to a new storage device). Moreover, in the previous example, all instances of matches can be indexed by the $2 value returned by the pattern matching, thereby indexing sell orders by ticker symbol and copying all records of those sell orders to a separate disk drive. This example is given for illustration and is not limiting. For example, a delete "all but" operation can be used on a copy of an archive to create a version that is indexed and includes only emails sent by a certain user.

In certain embodiments, systems and methods of the invention operate to "go to" the data (e.g., behind a firewall). In some embodiments, the data is property of an independent firm and the indexing system and method is operated by a service provider. The service provider can index the data in situ, e.g., as the data is behind the firewall of the independent firm. Indexing data in situ, or behind the firewall of the independent firm provides the additional benefit of a minimal hardware footprint. In some embodiments, the data is migrated to the cloud or migrated into storage of the service provider. Additionally, indexing can be performed in a hybrid in situ, local copy model. Any specified subset of the target archive can be copied onto storage and index there, while the remainder is indexed in situ within the archive. In some embodiments, the indexing itself determines whether certain material is copied into a secondary storage device (e.g., into storage of the indexing system). If certain material, items, or embedded data satisfy a user's criteria, that material can be copied into the storage.

The invention provides systems and methods for load-balancing, fault tolerance, and intelligent processing.

Load balancing includes multiple parallel processers and a system of messaging between processors. In some embodiments, the system includes a top-level primary processor and a plurality of second level secondary processors and a system of messaging between the levels of processors.

The primary processor distributes tasks to the secondary processors, which can be in the same computer, a virtual computer on the same physical computer or a different computer. Each secondary processor reports back when it has completed a task, and the primary processor sends it a new task or the secondary processor takes a next task from a queue. This ensures all processors remain as close as possible to full utilization until all the tasks are finished, which minimizes the hardware footprint. It also maximizes scalability; the more secondary processors available together with sufficient memory, the faster the system can complete the task. This load balancing provides a dynamic and flexible approach to allocating tasks to processors. This prevents a situation where some processors are doing all the work, or choking on difficult data, while others are waiting around (sometimes forever) for their next task.

Fault tolerance according to the invention ensures that the system processes all tasks that are fed into it. Some tasks, such as corrupt files, can cause a processor to crash. Some tasks just fail for no obvious reason. If a task fails, it will roll back to a stable state and restart. If a task fails multiple times, it can be marked as unreadable. If the system encounters corrupt or unreadable files, it simply picks up where it left off. Every single electronic item in an archive is indexed in great detail, or it is marked as unreadable (e.g., for physically corrupt or absent material). Systems and methods of the invention recovery seamlessly whenever an individual processor fails, without losing data.

Intelligent processing can include multiple queues. For example, a system may operate from a job queue from the archive and employ one or more internal work queues. In some embodiments, a primary processor maintains a job queue and a work item queue. The job queue contains items delivered from a file system—these may be individual loose files; complex files with embedded components, such as zip files; or even entire email databases or forensic images. The work item queue contains individual items that a single processor can manage, such as an email message or a Word document.

Systems and methods of the invention provide secondary processors that can make intelligent decisions about each task they receive. If it is an individual item, they process it directly. If it contains multiple individual items, the processor can either index these directly or break the file into its components and add these to the work item queue. Each secondary processor makes this decision based on a number of heuristics. If a task contains multiple compound items, the secondary processor can add these to the job queue. This ensures that the system processes compound files and embedded items with forensic thoroughness and as quickly as possible. The load-balancing secondary processors provide an additional benefit of more comprehensive and thorough indexing than prior art systems. In prior art systems, a secondary processor is allocated a task which it simply must complete to the best of its ability. In systems and methods of the inventions, the secondary processors are operable to detect where an item to be indexed is associated with embedded data and to create a new work item for the embedded data, causing a second secondary processor to index the embedded data. If the embedded data (ED1) has data embedded within it (ED2, i.e., ED2 is embedded data within embedded data ED1), the second secondary processor will discover the ED2 embedded data and create new work item for that (ED2). This process is fully recursive.

To illustrate, a business enterprise may have an archive stored distributed across a RAID array. One electronic item within that archive may be a disk image of a hard drive from a retired email server. The disk image may contain an email database in which messages are broken up into components. One entry in the email database may be an email message that had an attachment (the attachment, the other components of the email, and the database entry may all be on separate physical components of the RAID array), and the attachment may, itself, be an email message. The email message that was an attachment may not be an entry in the email database. The email message that was an attachment may itself further have an attachment. The attachment embedded in the email message that was an attachment may be a presentation file from a presentation program such as the one sold under the trademark POWERPOINT by Microsoft Corporation (Redmond, Wash.). Slides within the presentation file may include jpeg files that were inserted. One jpeg file within the presentation file may include a hidden embedded watermark identifying a copyright owner of the jpeg picture content.

In this example, there are several levels of embedded data, as follows: RAID array>archive>disk image>email database>email 1 entry in database>email 2 attached to email 1>presentation file attached to email 2>jpeg file in presentation file>digital watermark in jpeg file. Some prior art systems would have indexed only to some arbitrary depth of this recursive structure, having no mechanism for plucking an electronic item from within the structure and treating it as having equal status as any other item from within the structure while also remembering the proper location of the item from within the recursive structure. Systems and methods of the invention are operable to determine the presence of each instance of embedded data and create an associated work item, with all work items being co-equal.

As applied to the just-described example, the indexing job will not end with the top-level content of the email database (i.e., discovering only email 1). Systems and methods of the invention will go on to discover, and fully index, email 2 as well as the presentation file attached to email 2. As a result, an indexing job performed using systems and methods of the invention will show that email 2 went from its sender to its recipient with the presentation file attached and further that the presentation had the specifically digitally-watermarked jpeg file therein. By such a mechanism, systems and methods of the invention may uncover numerous electronic items that prior art systems do not find.

These capabilities ensure that the system extracts the maximum performance from server hardware when processing all kinds of unstructured data.

In addition to its massive parallel processing capabilities, systems and methods of the invention provide tools for accessing information in, and understanding, complex file and storage types such as email databases and archives, forensic images and WORM storage. This makes it possible for the system to process all layers of unstructured data—in situ and behind the firewall—cracking open the formats of the largest and most complex storage containers to extract the content inside them.

Without this capability, indexing systems are restricted to scanning for loose text or extracting data through application programming interfaces, which are slow and can only supply a limited amount of data and metadata. This means the system finds data that other systems miss.

Systems and methods of the invention can process more than 100 million email messages and attachments per day. Systems and methods of the invention delivers near-linear scalability in multi-socket servers with multi-core processors. Systems and methods of the invention use a deep understanding of files, file-structures and text and metadata extraction to provide high-quality indexing.

Reference will now be made in detail to exemplary embodiments of the present disclosure as illustrated in the accompanying figures. The same reference numbers in different drawings may identify the same or similar elements.

FIG. 1 shows a data processing system 100 for parallelizing document indexing. Data processing system 100 is generally comprised of a primary processor 102, a job queue 104, a work item queue 106, a secondary processor 108, and a data storage medium 110. Data processing system 100 is further comprised of a messaging module (not show in Figure). In an embodiment, data processing system 100 includes at least one primary processor 102 and at least one secondary processor 108. For example, data processing system 100 may include one primary processor 102 and twenty secondary processors 108, wherein each processor includes multiple processing cores. In an embodiment, data processing system 100 may be provided utilizing common off-the-shelf hardware.

As shown in FIG. 1, each of primary processor 102 and secondary processor 108 may be a separate computer device, or may be a processor (e.g., a microchip) within a multi-processor device or a processor on a virtual machine on the same physical computer. Data storage medium 110 may be a physical disk drive within one of the processor computer devices or may be an independent physical storage medium, including a RAID drive, an external hard drive, a third-party computer network, a cloud-based storage location, or a combination thereof. Generally, each processor will be operably coupled to at least one RAM memory device. Any suitable computer device or combination of computer devices may be used to provide the functionality as illustrated in FIG. 1. For example, each processor may be provided by a rack-mounted server device such as the computer sold under the trademark BLADE by Hitachi Data Systems (Santa Clara, Calif.). In some embodiments, all of the functionality depicted in FIG. 1 is provided by a single primary computer device with one or more processor (e.g., a plurality of virtual processors), or a terminal computer device operably coupled to a server, in which the terminal device (e.g., a laptop such as the computer sold under the trademark SERIES 9 by Samsung (Seoul, South Korea) provides a primary processor and the server provides a secondary processor.

In certain embodiments, the indexing system includes a hypervisor or similar product that creates a plurality of virtual machines. The hypervisor can allocate processing power to each virtual machine as-needed or under the control of an administrator. Since the hypervisor can allocate resources as-needed to the virtual machine and re-capture the capacity of idle resources, indexing projects can be accomplished with less time across numerous dedicated machines and particularly with less idle time of dedicated hardware. Any suitable virtual machine product may perform the role of hypervisor. The indexing system creates a desired number of virtual machines in which guest software executes as if it were running directly on physical hardware. The described architecture provides a number of benefits. The system operates at significantly lower energy consumption, resources are used more efficiently in terms of providing results rapidly, and subsystems can be more easily maintained, inspected, updated, and protected that with dedicated hardware embodiments.

In certain embodiments, one or more of the virtual machines each allow a guest OS (e.g., each one designed for the same instruction set) to be run in isolation. This may be allowed by including such tools as, for example, Parallels Workstation, Parallels Desktop for Mac, VirtualBox, Virtual Iron, Oracle VM, Virtual PC, Virtual Server, Hyper-V, VMware Workstation, VMware Server (formerly GSX Server), KVM, QEMU, Adeos, Mac-on-Linux, Win4BSD, Win4Lin Pro, and Egenera vBlade technology, Linux KVM, VMware Workstation, VMware Fusion, Microsoft Hyper-V, Microsoft Virtual PC, Xen, Parallels Desktop for Mac, Oracle VM Server for SPARC, VirtualBox and Parallels Workstation. The hypervisor may be provided by any suitable manager such as, for example, the NVIDIA VGX Hypervisor, which allows a virtual machine to interact directly with a processor. The hypervisor manages resources to allow multiple indexing sub-systems to share common hardware. Each virtual machine can provide a guest operating system or processing environment. The guest OS can provide applications, drivers, APIs, and remote protocol tools. Virtualization and data processing are discussed in U.S. Pat. No. 8,239,938; U.S. Pat. No. 7,672,790; U.S. Pat. No. 7,743,189; U.S. Pub. 2011/0274329; U.S. Pub. 2008/0143707; and U.S. Pub. 2004/0111552, the contents of each of which are incorporated by reference. Components may be onsite or off-site relative to one another or to the computer systems to be indexed. Components can be connected by network resources, which can include the Internet, a WAN or LAN, cellular telephone data networks, other methodology, or a combination thereof. It has been found that operating indexing systems in a virtualized environment with up to 12 cores provides particularly useful results.

The messaging module of data processing system 100 may be any means for communication between the components of data processing system 100. For example, the messaging module may be a Java Messaging Service (JMS) Application Programming Interface (API) utilized over a gigabit Ethernet. In an embodiment of the present disclosure, the message module is Apache ActiveMQ. In another embodiment, the messaging module utilizes TCP/IP sockets and MPI or PVM messaging libraries. Enterprise messaging systems, which provide additional facilities such as persistent messaging and message queues, may also be adapted as the messaging module. The message processing module further utilizes a messaging processing module to process status messages.

In an embodiment of the present disclosure, data processing system 100 implements a parallel processing architecture in which a large collection of data requires processing and each set of data contains an unpredictable amount of processing requirements. In this architecture, primary processor 102 receives a list of data from data storage medium 110. Data storage medium 110 may be, for example, one or more of a hard disk drive, solid state drive (SSD), an optical disc, flash memory, zip disk, tape drive, "cloud" storage location, or a combination thereof. Primary processor 102 stores the list of data in local memory utilizing job queue 104 and work item queue 106. In an embodiment, a separate data storage medium, such as a disk-based storage drive, may be used if the entries of work item queue 106 are too large to store in the local memory. Preferably, the list of data is stored in a tangible, non-transitory medium (e.g., one or more of a hard disk drive, solid state drive (SSD), an optical disc, flash memory, zip disk, tape drive, "cloud" storage location, or a combination thereof). It is noted that, pre-indexing, this list typically represents and points to the accumulated, archived, and unstructured work product of a business enterprise (e.g., the communications, contracts, documents of title, incorporation papers, work product, intellectual property, and other materials possessed by an entity).

Primary processor 102 creates work items (not shown in Figure) based upon the list of data. A work item in data processing system 100 specifies an item of data that needs to be processed. For example, the item of data within a work item may be an exchange database file (EDB) file, a disk image file, an email message inside a Microsoft Outlook PST file, a Microsoft Word document, a zip file, an email message, and a Lotus Notes database file.

In an embodiment, a work item may be comprised of the physical location of the data stored in data storage medium 110, at least one data identifier to distinguish the location of embedded data associated to the data, and an identifier associated with the data. The identifier associated with the data may be a globally unique ID of the processing job that the work item is a member of. The physical location of the data may be represented by a root URL such as a file path to a PST file ("c:\evidence\input.pst"). The at least one data identifier may be an array of embedded IDs leading to the actual embedded data item inside the top-level data item. The actual values chosen for embedded IDs is implementation-dependent, but a simple implementation could be the embedded child ID based on position. For example, to describe a work item of the second attachment in the seventh email, inside the fourth folder, and inside a PST file, the at least one data identifier would be (assuming indexes start at 0): {"3", "6", "1"}.

Primary processor 102 monitors and tracks work items which needs to be processed by secondary processor 108. Each secondary processor 108 can ask primary processor 102 for a new work item to process whenever it is idle. In an embodiment, each secondary processor 108 executes four separate processes for requesting and processing work items. Once secondary processor 108 has finished processing a work item, secondary processor 108 may ask primary processor 102 for another work item. In another embodiment, primary processor 102 provides work items in a batch, for example, ten work items at once, to each secondary processor 108 to remove messaging latency. Since each secondary processor 108 controls work allocation explicitly, this architecture automatically provides load-balancing.

For the purposes of load-balancing, it is inefficient for secondary processor 108 to process an entire exchangeable database file, while another secondary processor 108 processes a single electronic file. In an embodiment, secondary processor 108 includes a data processor (not shown in Figure) to determine characteristics of embedded data within a work item. The data processor may process the work item based upon the type of embedded data, such as an exchangeable database file, a Microsoft Outlook email file, a Lotus Notes database file, a mailbox message file, an Outlook Express mail file, an Encase disk image file, raw disk image files, and partitions within a disk image. The data processor may also, for example, utilize the following classifications to determine the appropriate means to process embedded data:

INLINE: indicates a relatively simple embedded data (for example a word processing document) that should be processed immediately without any additional communication to primary processor 102.

WORK_ITEM: indicates that the embedded data is sufficiently complex that it should be processed by another secondary processor 108. The embedded data is sent to primary processor 102 to provide to another secondary processor 108 to process this embedded data.

PROCESSING_JOB: indicates that it is very complex data which primary processor 102 needs to handle as a separate processing job.

As secondary processor 108 processes a data item, which may contain embedded data therein, secondary processor 108 may send a status message to primary processor 102 to indicate that the embedded data should be processed by another secondary processor 108. Upon processing each job and work item within job queue 104 and work item queue 106, primary processor 102 may signal each secondary processor 108 and any intermediate results created by each secondary processor 108 can be passed to primary processor 102 for final aggregation.

Data processing system 100 may include a fault tolerance mechanism (not shown in Figure). A fault tolerance mechanism may be provided on primary processor 102 and each secondary processor 108 to ensure that an entire process does not need to be restarted from the beginning in the event of a software or hardware failure.

In an embodiment, a failure tolerance mechanism is provided on at least one secondary processor 108. If secondary processor 108 has a software or hardware failure, a fault tolerance mechanism can allow secondary processor 108 to restart its processes and continue to receive status messages from primary processor 102. The fault tolerance mechanism may be implemented to allow the messaging module to recognize when secondary processor 108 has restarted, and if necessary, re-deliver any outstanding status messages to secondary processor 108 (or re-route them to other secondary processors 108).

A fault tolerance mechanism may also be provided on primary processor 102. If primary processor 102 has a software or hardware failure, a fault tolerance mechanism can allow primary processor 102 to restart its processes and continue to provide status messages to secondary processor 108. In an embodiment, each secondary processor 108 is restarted upon the failure of primary processor 102, and the pending work items in work item queue 106 are serialized to ensure that remaining jobs in job queue 104 are processed upon restarting primary processor 102.

Figure 2:
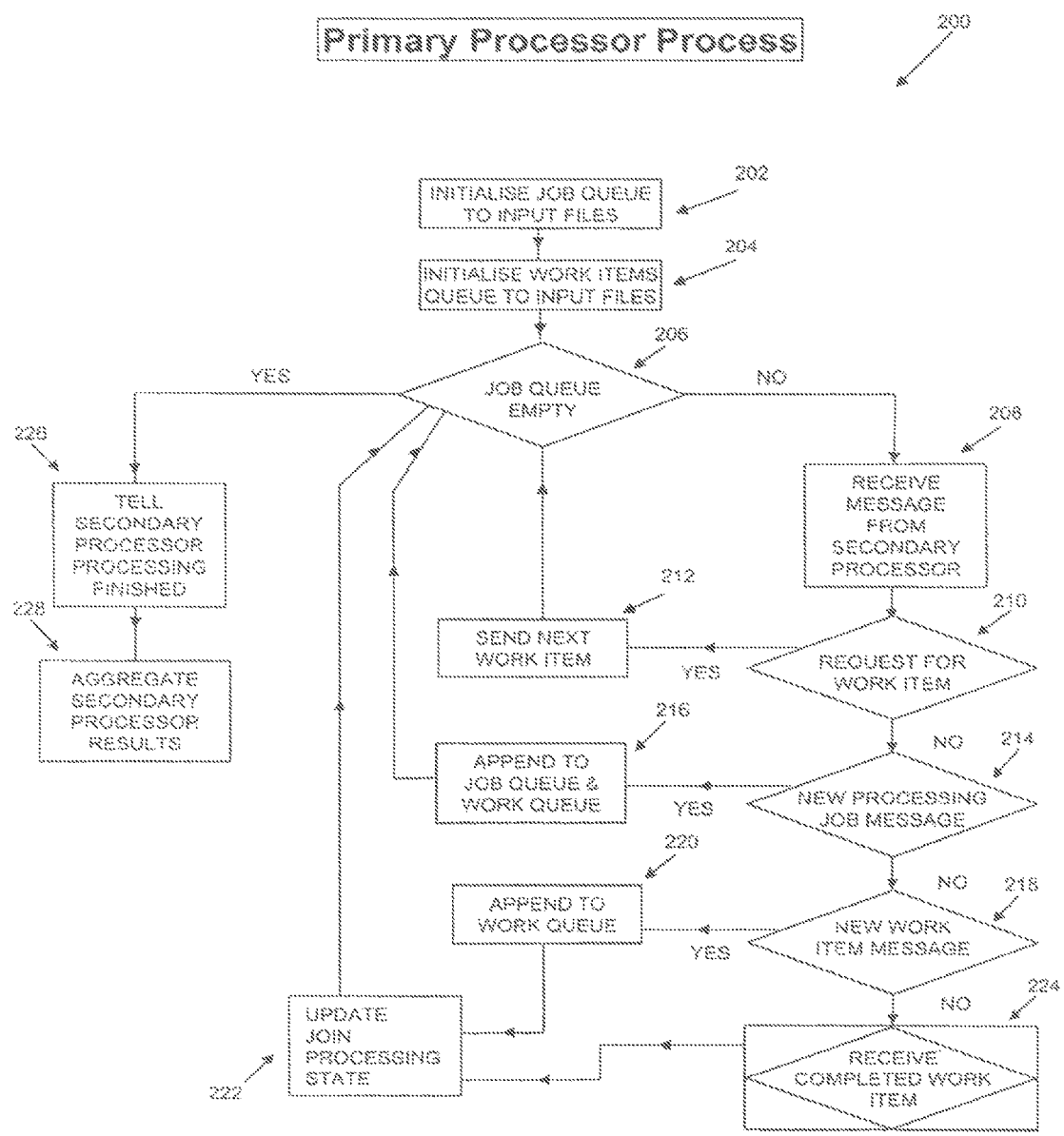
FIG. 2 is a functional block diagram of a method for parallelizing document indexing.

FIG. 2 shows a functional block diagram of a method 200 performed by a primary processor for parallelizing document indexing. Method 200 may include, but is not limited to the following steps, which are not limited to any particular order.

At step 202, primary processor 102 takes a list of data from data storage medium 110 as an input and initializes job queue 104. Primary processor 102 creates one entry within job queue 104 for each instance of data.

At step 204, primary processor 102 takes the list of data from data storage medium 110 and initializes work item queue 106. Primary processor 102 also creates one entry within work item queue 106 for each instance of data. Each entry within job queue 104 is initialized to indicate that it has one unprocessed work item associated with it.

At decision step 206, primary processor 102 determines whether job queue 104 is empty. If job queue 104 is empty, primary processor 102 continues to step 226. At step 226, primary processor 102 provides a status message to each secondary processor 108 to indicate that all processing jobs have been completed. At step 228, primary processor 102 aggregates the processing results of each secondary processor 108.

At step 208, primary processor 102 receives a status message from secondary processor 108. The status message provided by secondary processor 108 may be, but is not limited to, the following: a request for a work item, a request for another secondary processor 108 to process a work item, a request for primary processor 102 to create a new entry within job queue 104 and provide the new work item to another secondary processor 108, a processed work item, or a processed work item related to embedded data.

At decision step 210, primary processor 102 processes the status message to determine whether secondary processor 108 is requesting a new work item. If secondary processor 108 requests a new work item, primary processor 102 proceeds to step 212. At step 212, primary processor 102 takes the next work item in work item queue 106 and provides the work item to secondary processor 108. Primary processor 102 proceeds to step 206.

At decision step 214, primary processor 102 processes the status message to determine whether secondary processor 108 is requesting primary processor 102 to create a new entry within job queue 104 and provide the new work item to another secondary processor 108. If secondary processor 108 requests primary processor 102 to create a new entry within job queue 104, primary processor 102 proceeds to step 216. At step 216, primary processor 102 appends job queue 104 and work item queue 106 and creates new entries therein. Primary processor 102 proceeds to step 206.

At decision step 218, primary processor 102 processes the status message to determine whether secondary processor 108 is requesting another secondary processor 108 to process the work item. If secondary processor 108 is requesting another secondary processor 108 to process the work item, primary processor 102 proceeds to step 220. At step 220, primary processor 102 appends the work item to work item queue 106. At step 222, the entry within job queue 104, in which the appended work item is associated, is updated. In an embodiment, job queue 104 is incremented by one to represent that a work item remains unprocessed. The step of incrementing is performed to ensure that it is clear when a processing job has been completed. A processing job is completed when there are no longer any unprocessed work items associated with that processing job.

At step 224, primary processor 102 processes the status message to determine whether secondary processor 108 is providing a processed work item. If secondary processor 108 is providing a processed work item, primary processor 102 proceeds to step 222. In an embodiment, upon receiving a processed work item, primary processor 102 decrements work item queue 106 for the associated work item. If work item queue 106 is decremented to a value of zero, the associated entry within job queue 104 is removed from job queue 104.

Figure 3:
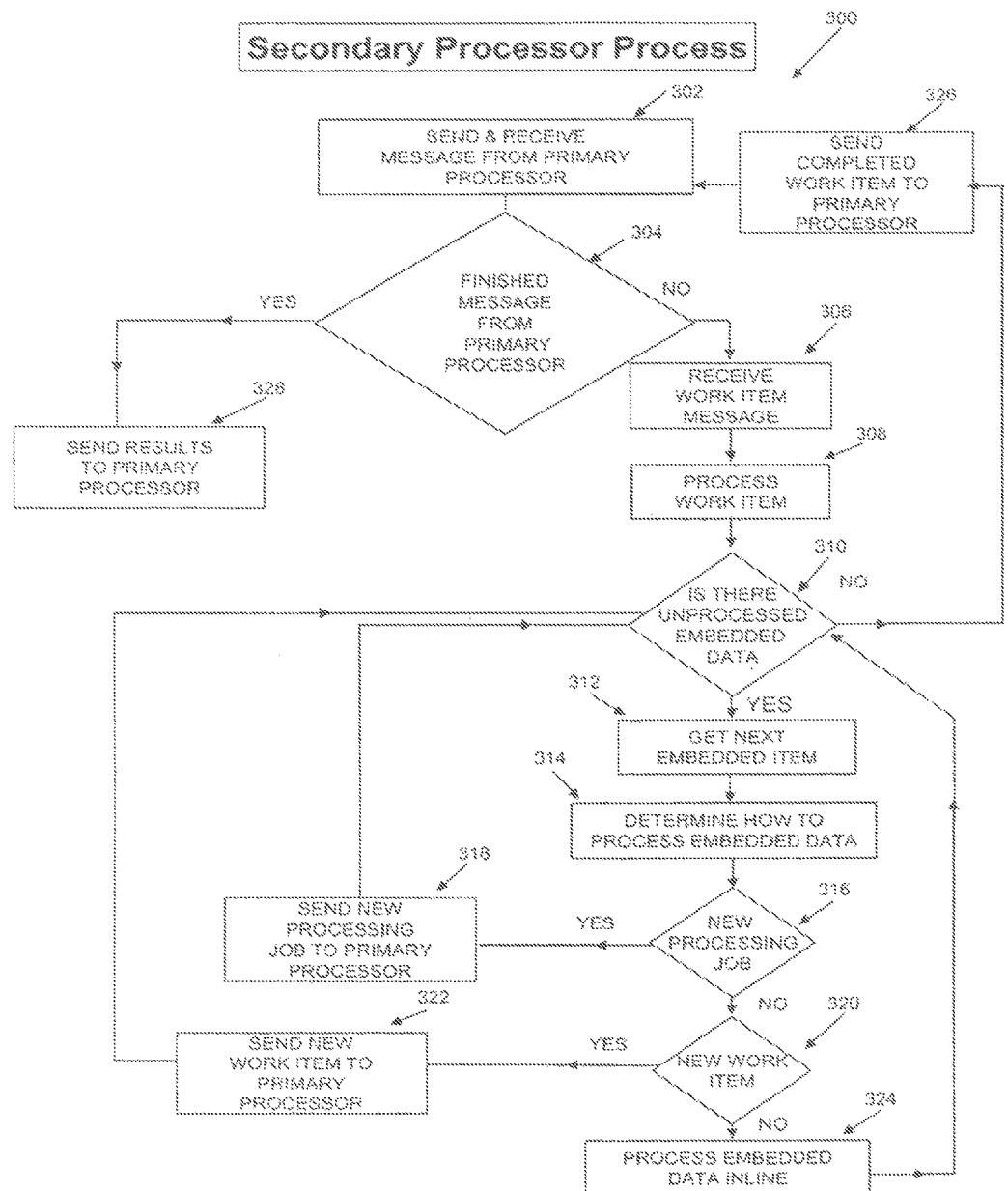
FIG. 3 is a diagram of indexing methods of the invention.

FIG. 3 shows a block diagram of a method performed by at least one secondary processor for parallelizing document indexing. Method 300 may include, but is not limited to, the following steps, which are not limited to any particular order.

At step 302, secondary processor 108 communicates with primary processor 102 via the messaging module. Secondary processor 108 sends a status message to primary processor 102 to request a work item if it has no active work items to process. Upon sending a message to primary processor 102, secondary processor 108 waits for a response status message from primary processor 102.

At decision step 304, secondary processor 108 receives a status message from primary processor 102. If primary processor 102 provides a status message to indicate that all processing jobs have been completed, secondary processor 108 proceeds to step 328. At step 328, secondary processor 108 transmits a status message, which includes the results of the processed work items, to primary processor 102. In an embodiment, the step of transmitting occurs via a remote-file system copy.

At step 306, secondary processor 108 receives and processes a status message relating to a work item from primary processor 102. At step 308, secondary processor 108 processes the work item as set forth in the status message. The actual work item described in the status message is interpreted by secondary processor 108 to ensure that it is clear which data needs to be processed. For example, the data could be email number 56 in an archive file.

At decision step 310, secondary processor 108 determines if the data of the work item contains embedded data. For example, embedded data may be an electronic mail which contain attachments, or a Microsoft PST folder which contains an email message. If secondary processor 108 determines that the work item contains embedded data, secondary processor 108 proceeds to step 312.

At step 312, secondary processor 108 processes the work item to extract the embedded data. At step 314, the data processor of secondary processor 108 determines a characteristic of the embedded data. Based upon the characteristic of the embedded data, secondary processor 108 determines the appropriates means to process the embedded data.

At decision step 316, the data processor determines whether the work item contains very complex data. At step 318, if the data processor determines that the work item is complex, secondary processor 108 will provide a status message to primary processor 102 to create a new entry within job queue 104 and provide the new work item to another secondary processor 108.

At decision step 320, the data processor determines whether the work item should be handled by another secondary processor 108. At step 322, if the data processor determines that the work item should be handled by another secondary processor 108, secondary processor 108 will send a status message, which includes the work item, to primary processor 102.

At step 324, secondary processor 108 processes the embedded data. At step 326, secondary processor 108 transmits a status message, which includes the completed work item and associated embedded data, to primary processor 102.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1

An indexing system and method of the invention was engaged to index more than 2.5 billion email messages in a client's email archives kept in WORM storage. The system found an additional 500 million messages no-one knew were there.

Example 2

An indexing system and method of the invention was used to analyze a small segment of a file share data for a company. Although the company had already paid its service provider to clean the data, a system of the invention found 5% duplication at the file system level. When complex file types such a zip and PST files were included, the system identified a total duplication rate of 25%.

Example 3

An indexing system and method of the invention was operated in a virtualized environment with 12 processors and multiple virtual machines and obtained particularly useful results in terms of efficiency and rapidity.

What is claimed is:

1. An indexing system for indexing a digital storage system, the indexing system comprising:
   a primary processor coupled to a memory, wherein the indexing system comprises instructions that when executed cause the indexing system to scan the digital storage system comprising an electronic item stored as a plurality of components and create a work item for each component; and
   a plurality of secondary processors coupled to the primary processor, each of the secondary processors being configured for load-balancing operations, wherein execution of the instructions causes each secondary processor to:
   receive a first work item for a first component,
   determine characteristics of embedded data within the first component, and
   determine, based on the characteristics, whether to index the first component or create a new work item based on the first component and send the new work item to a different secondary processor, wherein each work item specifies data for processing, the specified data of the first work item being different from the specified data of the new work item, and
   further wherein execution of the instructions causes the primary processor to aggregate results generated by the plurality of secondary processors indexing the plurality of components and produce an aggregate comprising an index for the electronic item.

2. The system of claim 1, wherein the digital storage system comprises an email archive and the electronic item is an email message.

3. The system of claim 2, further comprising a database wherein an entry within the database corresponds to the email message and specifies the location of the plurality of components.

4. The system of claim 2, wherein the embedded data within the first component comprises an email attachment.

5. The system of claim 4, wherein the attachment comprises a zip file, the zip file comprises a word-processing document, and the word-processing document comprises an inserted picture.

6. The system of claim 5, wherein the determined characteristic of the embedded data comprises the presence of the inserted picture within the word-processing document.

7. The system of claim 1, wherein the digital storage system comprises a storage area network.

8. The system of claim 1, wherein the primary processor and the plurality of secondary processors are each provided within a virtual machine.

9. A system for indexing electronic information, the system comprising:
   a primary processor coupled to a tangible memory, a first secondary processor, and a second secondary processor, each of the processors being configured for load-balancing operations, wherein the indexing system comprises instructions that when executed cause:
   the primary processor to create a work item that specifies a database entry in an archive system and send the work item to the first secondary processor, the database entry identifying locations of components of an electronic item within the archive system;
   the first secondary processor to:
      determine characteristics of embedded data within the components,
      classify the components based on the determined characteristics,
      index a first component based on a first classification,
      create a new work item comprising a second component of the electronic item based on a second classification, and
      send the new work item to the second secondary processor; and
   the second secondary processor to index the second component, wherein the first component is different than the second component.

10. The system of claim 9, further comprising a hypervisor module operable to create a primary virtual machine in which the primary processor operates and a secondary virtual machine in which the first secondary processor operates.

11. The system of claim 9, wherein the electronic item is an archived email message.

12. The system of claim 11, wherein the primary processor is further operable to aggregate results from the indexing of the first component and the indexing of the second component to provide an index for the email message.

13. The system of claim 11, wherein the database entry identifies locations of five components of the archived email message.

14. The system of claim 13, wherein the first component comprises text from an email body; the second component comprises an attachment; a third component comprises meta-data; a fourth component comprises a recipient email; and a fifth component comprises an index or database showing where the components can be found and how many there are.

15. The system of claim 9, wherein the primary processor is further operable to create a plurality of work items wherein each of the plurality of work items specifies data within the archive system to be processed and the first secondary processor and second secondary processor are each operable to classify any work items and create new work items.

16. The system of claim 9, wherein the first secondary processor is further operable to determine the characteristics of embedded data within the components of the electronic item, wherein the electronic item is behind a firewall of the archive system.

17. A system for indexing an electronic item, the system comprising:
   a primary processor coupled to a tangible memory, coupled to a first secondary processor, and coupled to a second secondary processor, each of the processors being configured for load-balancing operations, wherein the indexing system comprises instructions that when executed cause:
   the primary processor to:
      scan a storage archive comprising a database entry for an electronic item,
      create a work item indicating the database entry, and send the work item to the first secondary processor;
   the first secondary processor to:
      read the database entry,
      identify a location of a first component of the electronic item,
      identify a location of a second component of the electronic item, wherein the first component is different than the second component,
      determine that the first component should be processed by the second secondary processor,
      create a new work item comprising the first component,
      send the new work item to the second secondary processor, and
      index the second component to produce a second result; and
   the second secondary processor to:
      index the first component to produce a first result,
      further wherein execution of the instructions causes the indexing system to aggregate the first result and the second result and provide an index of the electronic item.

* * * * *